US006475450B1

(12) United States Patent
Saruta et al.

(10) Patent No.: US 6,475,450 B1
(45) Date of Patent: Nov. 5, 2002

(54) METHOD OF LEACHING ZINC CONCENTRATE

(75) Inventors: Kaoru Saruta, Gojome-cho; Norihito Ishimori; Hitoshi Masuda, both of Akita, all of (JP)

(73) Assignee: Dowa Mining Co., Ltd., Tokyo (JP)

( * ) Notice: Subject to any disclaimer, the term of this patent is extended or adjusted under 35 U.S.C. 154(b) by 0 days.

(21) Appl. No.: 09/693,360

(22) Filed: Oct. 20, 2000

(30) Foreign Application Priority Data

Jan. 31, 2000 (JP) ........................................ 2000-021143

(51) Int. Cl.[7] ........................... C22B 19/00; C22B 61/00
(52) U.S. Cl. ........................................ 423/109; 423/140
(58) Field of Search ................................. 423/109, 140

(56) References Cited

U.S. PATENT DOCUMENTS

| 3,687,828 A | 8/1972 | Carpenter et al. |
| 4,128,617 A | 12/1978 | DeGuire et al. |
| 5,380,354 A | * 1/1995 | Chalkley et al. |
| 5,858,315 A | 1/1999 | Van Put et al. |

FOREIGN PATENT DOCUMENTS

| EP | 0 039 837 A | 11/1981 |
| EP | 0 451 456 A | 10/1991 |

* cited by examiner

*Primary Examiner*—Steven Bos
(74) *Attorney, Agent, or Firm*—Frishauf, Holtz, Goodman & Chick, P.C.

(57) ABSTRACT

A method for directly leaching a zinc concentrate in one of the stages contained in the hydrometallurgical process for the production of electrolytic zinc. The method comprises: a neutral leach step, a zinc concentrate leach step, and an iron oxidation step. In the zinc concentrate leach step, a neutral leach residue and an iron sediment returned from the iron oxidation step are repulped by the spent electrolyte followed by adding thereto zinc concentrate to extract zinc from the zinc concentrate by carrying out a leaching under atmospheric pressure and at a temperature of not lower than 90° C., but not higher than the boiling point of the solution. According to this method, the concentration of Fe(III) ions in the zinc concentrate leach solution is significantly increased. Due to this Fe(III) ion concentration, the leaching rate of the zinc concentrate is enhanced.

10 Claims, 2 Drawing Sheets

Note: (L) represents solution and (S) represents solid.

Note: (L) represents solution and (S) represents solid.

Note: (L) represents solution and (S) represents solid.

METHOD OF LEACHING ZINC CONCENTRATE

BACKGROUND OF THE INVENTION

This invention relates to a method of leaching zinc concentrate under atmospheric pressure.

Conventional techniques for directly leaching zinc sulfide under atmospheric pressure include the method disclosed in Japanese Patent No. 2,856,933. This known hydrometallurgical process for the production of zinc comprises, as shown in FIG. 2, steps of roasting zinc concentrate and neutral leaching the resultant calcine with a spent acid solution (spent electrolyte) from the electrolytic winning stage to obtain iron-rich neutral leach residue, which is further leached with a spent acid solution to dissolve iron precipitate contained therein and obtain a solution of ferric sulfate, which is used for directly leaching zinc concentrate. This solution of ferric sulfate turns to a solution of ferrous sulfate as the leaching of zinc concentrate proceeds and the ferrous sulfate thus produced is oxidized by blowing an oxygen gas into the solution. The resultant solution of mixed ferrous and ferric sulfates is transmitted to the subsequent step for precipitating iron, where zinc concentrate is added to the solution again to thereby convert ferric sulfate into ferrous sulfate. Then, the resulting solution is subjected to the treatment for removing iron by precipitation.

The reaction of converting zinc concentrate into soluble zinc sulfate with a solution of ferric sulfate is represented by the following formula (1). The reaction of oxidizing ferrous sulfate (reduced product of ferric sulfate) with an oxygen gas is represented by the following formula (2). The concentration of ferric sulfate in the reactions of formulas (1) and (2) can be enhanced up to 10 g/liter at most.

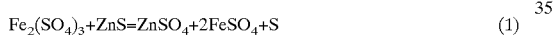
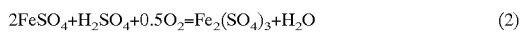

$$Fe_2(SO_4)_3 + ZnS = ZnSO_4 + 2FeSO_4 + S \quad (1)$$

$$2FeSO_4 + H_2SO_4 + 0.5O_2 = Fe_2(SO_4)_3 + H_2O \quad (2)$$

The method disclosed in Japanese Patent No. 2,856,933 makes it possible to recover zinc directly from zinc concentrate by dissolving zinc in the form of a soluble salt, wherein the amount of zinc which can be dissolved is proportional to the amount of iron contained in the calcine (oxidized ore) produced by oxidizing roasting zinc concentrate. Therefore, this method enables to increase the output of zinc. This method is superior to the conventional hydrometallurgical process for producing zinc, because it enables to increase the output of electrolytic zinc without reinforcing the currently available production unit inclusive of a roasting furnace and an apparatus for the production of sulfuric acid. However, this method has drawbacks in that the concentration of ferric ions is limited to a low level for the reason previously mentioned referring to the formulas (1) and (2). Therefore, the amount of zinc concentrate which can be added to balance the reaction is limited. Thus, it cannot increase the output of zinc to a maximum. Hence, the object of the present invention is to solve the above mentioned problems fundamentally and increase sharply the amount of zinc concentrate which can be added so as to make it possible to leach much more amount of zinc from zinc concentrate than the prior art, and to provide a method capable of enhancing the output of zinc without strengthening the capacities of currently available roasting furnace and sulfuric acid production apparatus.

SUMMARY OF THE INVENTION

In order to attain the above mentioned object the present inventors have made the keen investigation and as a result they have enabled to develop the present invention. That is, they have noticed that in the method disclosed in Japanese Patent No. 2,856,933 the amount of ferric ions necessary for leaching zinc concentrate is inevitably restricted, thereby restricting the amount of zinc concentrate which can be added to the pulp in the leaching stage. Under these circumstances, the present inventors have investigated to find out an appropriate way for increasing the amount of ferric ions contained in the pulp for leaching zinc concentrate.

DETAILED DESCRIPTION OF THE INVENTION

Figure 1:
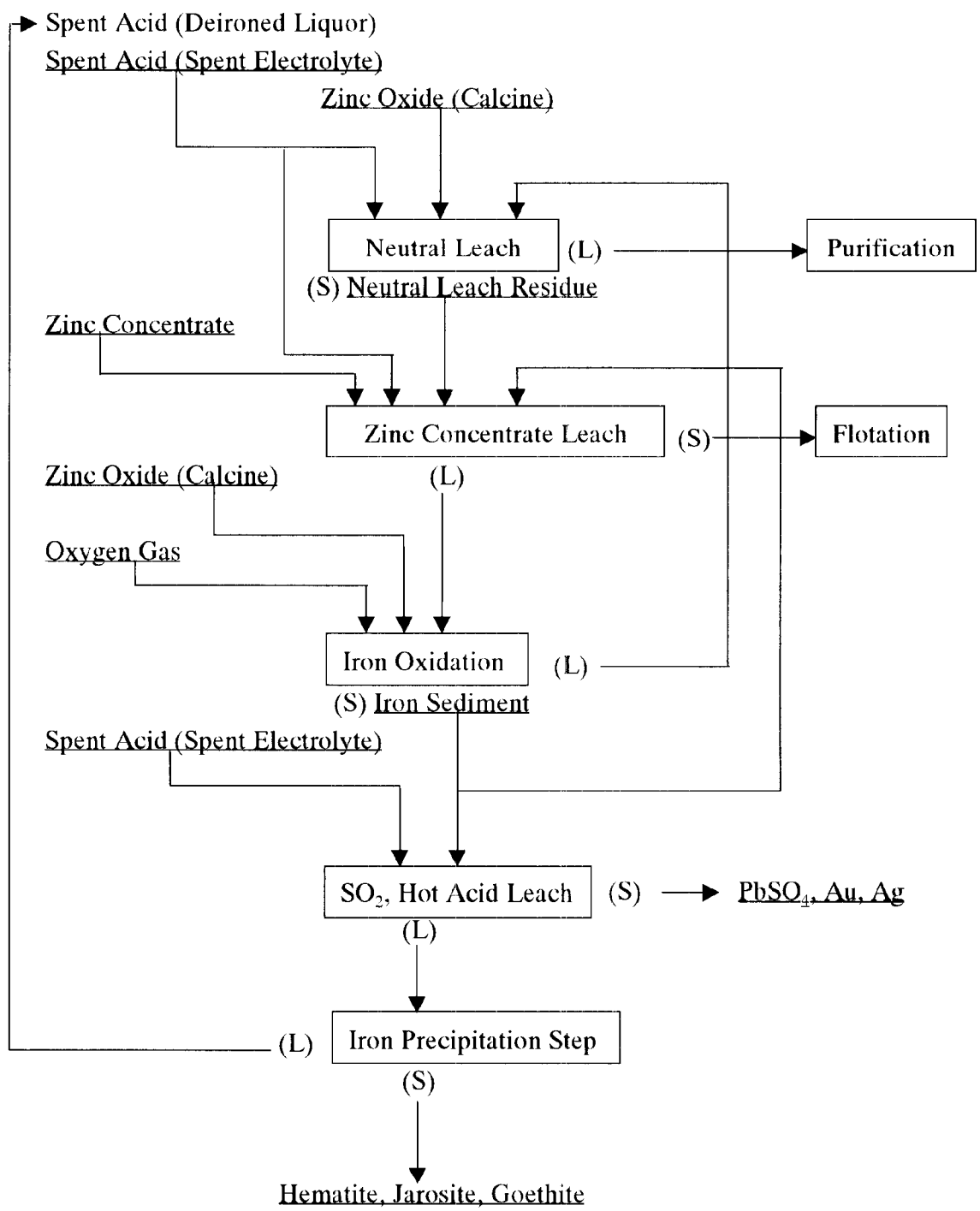
FIG. 1 is a flowsheet for a method of leaching zinc concentrate of the present invention.
Figure 2:
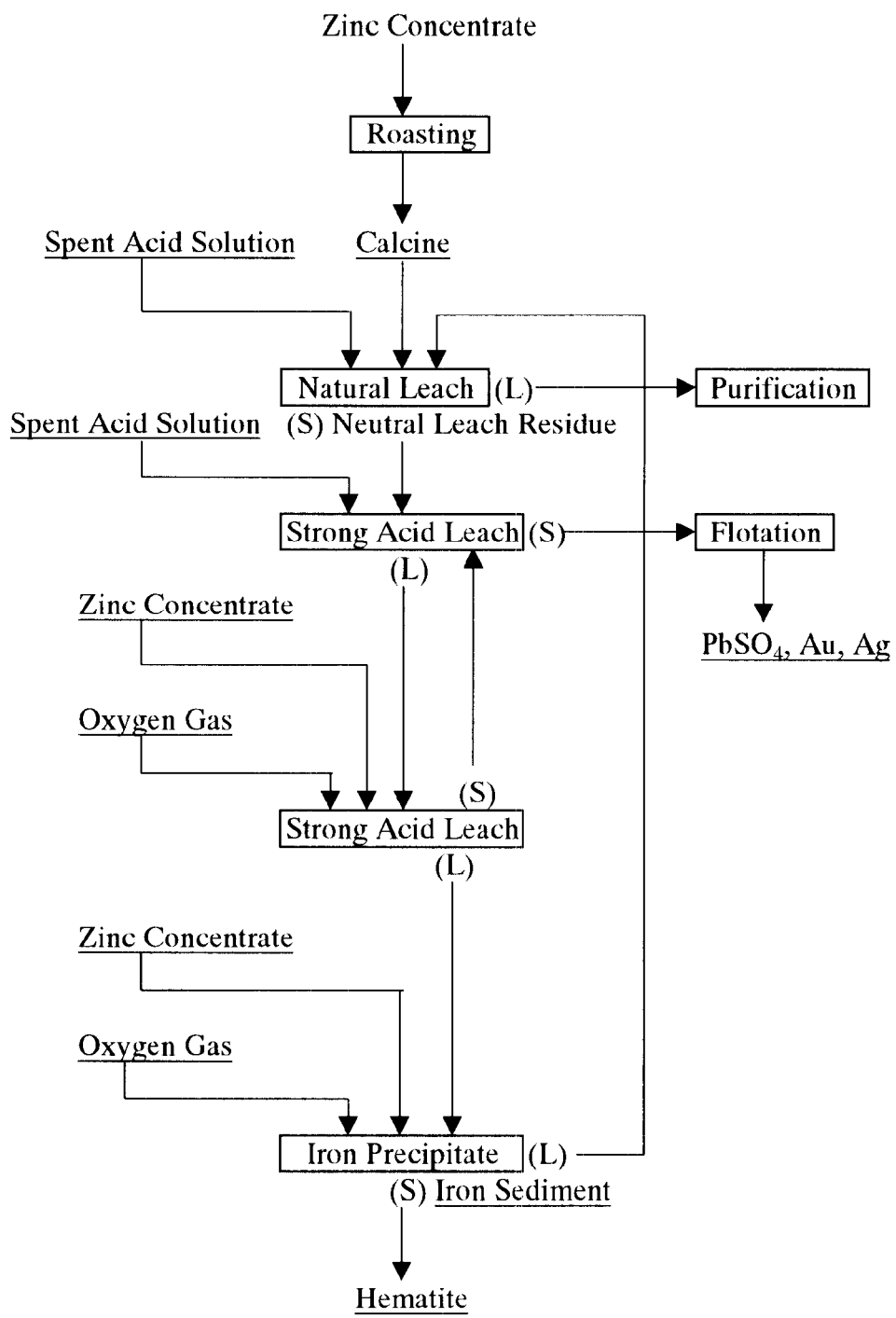
FIG. 2 is a flowsheet for a prior art method of leaching zinc concentrate.

As a result, they have found, in a hydrometallurgical process for producing electrolytic zinc, an improved method of leaching zinc concentrate which comprises:

a neutral leach step wherein calcine, which is obtained by roasting part of zinc concentrate and which mainly comprises zinc oxide, is leached with a spent acid solution (spent electrolyte) containing free acid produced in an electrolytic extraction step, thereby obtaining a solution of zinc sulfate (neutral leach solution);

a zinc concentrate leach step wherein a neutral leach residue containing zinc ferrite produced or remained as insoluble solid in the neutral leach step and at least part of an iron residue produced in the subsequent iron oxidation step are repulped with a spent acid solution (spent electrolyte), followed by adding to the resulting pulp zinc concentrate, thereby leaching zinc sulfide contained in the zinc concentrate under atmospheric pressure and at a temperature of not lower than 90° C. but not higher than the boiling point of the solution to thereby obtain a zinc concentrate leach solution;

an iron oxidation step wherein an oxidizing agent such as an oxygen gas or air is added to the zinc concentrate leach solution obtained in said zinc concentrate leach step, to thereby oxidize ferrous ions contained in said zinc concentrate leach solution into ferric ions and also adding to the same leach solution calcine (zinc oxide) used as a neutralizer in order to recover the iron content of the leach solution in the form of iron-sediment, at least part of which is returned to said zinc concentrate leach step, and the remaining part of iron sediment is transferred to the subsequent step for treating the residue, while the neutralized leach solution is returned to said neutral leach step.

In the second aspect, the present invention provides one preferred embodiment of the above mentioned method wherein the amount of said iron sediment returned from said iron oxidation step to said zinc concentrate leach step is controlled in such a manner that the total amount of the ferric iron present in the zinc ferrite contained in the neutral leach residue from the neutral leach step and the ferric iron contained in the iron sediment returned from said iron oxidation step to the zinc concentrate leach step is in the range of 30–60 g/L in terms of the iron content in the pulp in the zinc concentrate leach step.

In the third aspect the present invention provides another preferred embodiment of said first and second aspects wherein said means to add an oxidizing agent, in said iron oxidation step, to the leach solution obtained in said zinc concentrate leach step is to blow in at least one of an oxygen gas and air.

In the fourth aspect, the present invention provides the other preferred embodiment of the methods of said first to the third aspects wherein the formation of the iron sediment in said iron oxidation step is conducted under the conditions inclusive of a pH in the range of 3–4 and a temperature of not lower than 80° C.

In the fifth aspect, the present invention provides a still further embodiment of the methods of the first to the fourth aspects wherein at least part of the iron sediment produced in said iron oxidation step is returned to said zinc concentrate leach step and the remaining part of the iron sediment is transmitted to the subsequent residue treatment step which is any one of the hematite process, the jarosite process and the goethite process.

The method of the invention will be explained in more detail below referring to FIG. 1. Zinc concentrate is subjected to oxidizing roasting by the conventional method to obtain zinc oxide (calcine), which is subjected to neutral leach by free sulfuric acid (spent electrolyte) produced in the step of electrolytic extraction to obtain a solution of zinc sulfate. The zinc sulfate solution thus obtained is treated by the purification step, and then fed to the step of electrolytic extraction.

The zinc ferrite-containing residue remained as a sediment in the neutral leach step is transmitted, together with part of the iron sediment produced in the subsequent iron oxidation step, to the zinc concentrate leach step, wherein it is repulped with a mixture of a spent acid (iron-free solution from the iron precipitation step) and a spent acid (spent electrolyte) from the step of electrolytic extraction. Zinc concentrate is added to the resulting pulp and the leaching of zinc concentrate is effected under atmospheric pressure to dissolve zinc sulfide contained in the zinc concentrate. The amount of zinc concentrate which can be added here is about 1–1.2 times the stoichiometric amount with respect to the ferric ions. The leaching temperature is from 90° C. to the boiling point of the leach solution, and the leaching time is from 2 to 3 hours. In this step the iron contained in the zinc ferrite and in the iron sediment dissolves to become ferric ions, which in turn are reduced by zinc concentrate to become ferrous ions.

The zinc in the zinc concentrate (zinc sulfide) dissolves into the solution as zinc sulfate and the sulfur in the zinc sulfide becomes elemental sulfur. In this step the insoluble constitutes inclusive of gold, silver, copper, lead sulfate, elemental sulfur and non-leached sulfides which are contained in any of the zinc concentrate, the neutral leach reside and the iron sediments are recovered as solid products, which are then transmitted to the floatation and the like stages for the recovery of gold, silver, lead sulfate, silicon oxide, barium sulfate, elemental sulfur and various sulfides. Since the solution obtained in the zinc concentrate leach step contains a large amount of zinc and iron, it is transmitted to the iron oxidation stage for separating the iron content from the zinc content.

In the iron oxidation stage an oxygen gas is blown into the leach solution and zinc oxide (calcine) as a neutralizer is added to the solution in order to recover iron as an iron sediment by precipitating it at a pH of 3–4 and at a temperature of not lower than 80° C. If the pH is less than 3, the rate of oxidation retarded. On the contrary, if the pH is more than 4 the leach of zinc oxide does not proceed. If the temperature is lower than 80° C., the rate of reaction and the rate of leaching zinc oxide retarded. The iron sediment thus produced also contains non-dissolved metals such as gold, silver, lead or the like which have been carried thereinto from the calcine. These non-dissolved metals are also recovered by being precipitated together with iron. The solution whose zinc content has been further increased by the addition of zinc oxide for hydrolyzing iron is transferred to the neutral leach stage. Part of the iron sediment is, as previously mentioned, returned to the zinc concentrate leach step.

The amount of iron sediment to be returned to the zinc concentrate leach step is controlled in such a manner that the total amount of iron contained in said iron sediment and the iron content of the zinc ferrite produced in the neutral leach step is in the range of 30 g/L–60 g/L in terms of the iron concentration of the pulp in the zinc concentrate leach step. If said total amount of iron is less than 30 g/liter, the percent leach of zinc will be insufficient. If it exceeds 60 gliter, the effect will be saturated.

The remaining part of iron sediment is transferred, for example, to the $SO_2$ leaching step or to the HAL (Hot Acid Leaching) step, wherein it is treated by any one of the hematite process, the jarosite process and the goethite process.

According to the method of the present invention the reaction in the stage of leaching zinc concentrate proceeds as shown by the formula (1), wherein zinc sulfide is dissolved as zinc sulfate by ferric iron.

$$Fe_2(SO_4)_3 + ZnS = ZnSO_4 + 2FeSO_4 + S \tag{1}$$

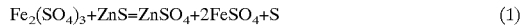

Ferrous sulfate produced at this stage by reduction reacts in the subsequent iron oxidation stage with an oxidizer such as an oxygen gas and also reacts with calcine (zinc oxide) to produce a precipitate according to the reaction represented by the following equation (2).

$$2FeSO_4 + 2ZnO + 0.5O_2 + H_2O = 2FeOOH + 2ZnSO_4 \tag{2}$$

Part of iron sediment obtained by the precipitation is returned to the zinc concentrate leach step, where it is dissolved in sulfuric acid according to the reaction of the following formula (3).

$$2FeOOH + 3H_2SO_4 = Fe_2(SO_4)_3 + 4H_2O \tag{3}$$

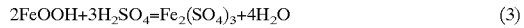

The ferric sulfate thus formed can repeat the reaction according to the formula (1) to further leach zinc concentrate into a soluble salt.

The invention will be described in more detail by the following examples.

EXAMPLE 1

If zinc concentrate is leached by a solution of ferric sulfate having an iron concentration of not less than 30 g/liter under atmospheric pressure and at a temperature between 90° C. and the boiling point of the solution for 2–3 hours, zinc will be dissolved at a percent leach of not less than 95%.

The results of leach tests carried out for varied time periods at a temperature of 95° C., and at an initial ferric ion concentration of 60 g/liter, with an agitation rate of 1000 rpm are as shown in Table 1.

TABLE 1

| Reaction Time (Hr) | Analysis of Leach Residue (%) | | | | Percent Leach (%) | |
|---|---|---|---|---|---|---|
| | Zn | Fe | S | T-S | Zn | Fe |
| 0 | 49.84 | 8.35 | 0.67 | 28.20 | 0.0 | 0.0 |
| 1 | 16.83 | 7.66 | — | — | 89.3 | — |
| 2 | 5.37 | 6.97 | — | — | 92.3 | — |
| 3 | 1.39 | 6.27 | 66.73 | 69.38 | 98.8 | 67.3 |

Note: S: elemental sulfur, T-S: total sulfur

COMPARATIVE EXAMPLE 1

Leaching test was carried out in the same procedure as in Example 1 expect that the initial ferric ion concentration was 6 g/liter.

TABLE 2

| Reaction Time (Hr) | Analysis of Leach Residue (%) | | | | Percent Leach (%) | |
|---|---|---|---|---|---|---|
| | Zn | Fe | S | T-S | Zn | Fe |
| 0 | 49.84 | 8.35 | 0.67 | 28.20 | 0.0 | 0.0 |
| 3 | 45.15 | 7.73 | — | — | 33.6 | — |
| 6 | 41.95 | 7.84 | — | — | 42.3 | — |
| 9 | 39.30 | 7.68 | 20.00 | 41.65 | 45.5 | 36.4 |

Zinc concentrate dissolves in the form of zinc sulfate with the amount of dissolved zinc depending on the amount of ferric ions. Thus, to attain the leach of a large amount of zinc concentrate in a short time, a solution of the highest possible concentration of ferric sulfate is needed. According to the method of the present invention, the ferric ions thus needed can be supplied by the repeated use thereof.

EXAMPLE 2

Upon being reduced by zinc concentrate, a solution of ferric sulfate becomes a solution of ferrous sulfate. If the solution thus obtained is heated at 80° C., while calcine (zinc oxide) is added thereto with an oxygen gas being blown in, and adjusting the pH within the range of 3–4, it is possible to precipitate the dissolved iron as iron sediment. An experiment for forming iron sediment was conducted by blowing an oxygen gas into the solution of ferrous sulfate under the condition of a reaction of 80° C. and an initial iron concentration of 60 g/liter, while calcine is added to the solution, with a pH being controlled in the range of 3–4. The results in Table 3.

TABLE 3

| Reaction Time (Hr) | Composition of Solution (g/liter) | |
|---|---|---|
| | Zn | Fe |
| 0 | 40.0 | 61.0 |
| 1 | 125.3 | 8.7 |
| 2 | 148.3 | 2.8 |
| 3 | 156.5 | 0.3 |

According to the method of the present invention Fe ions are forced to repeat conversions between the ferrous and ferric ions in order to enhance the concentration of Fe(III) ions in the zinc concentrate leach step as compared with the prior art method. As a result it has become possible to enhance the percent leach of zinc concentrate.

What is claimed is:

1. A method of leaching a zinc concentrate in a hydrometallurgical production of zinc which comprises:

(a) leaching a calcine, which is obtained by roasting a part of a zinc concentrate and which comprises zinc oxide, with a spent electrolyte containing free acid produced in an electrolytic extraction to thereby obtain a zinc sulfate solution;

(b) repulping a neutral leach residue containing zinc ferrite which remains as an insoluble solid in step (a) and at least part of an iron residue produced in an iron oxidation, with a spent electrolyte to provide a pulp, and adding a zinc concentrate to the pulp to leach zinc sulfide contained in the zinc concentrate under atmospheric pressure and at a temperature of not lower than 90° C., but not higher than the boiling point of the zinc sulfate solution to obtain a zinc concentrate leach solution; and (c) adding an oxidizing agent to the zinc concentrate leach solution obtained in step (b) to oxidize ferrous ions contained in said zinc concentrate leach solution into ferric ions and adding calcine to the zinc concentrate leach solution as a neutralizer to recover iron, as an iron sediment, in the zinc concentrate leach solution, at least part of the iron being returned to step (b), with the remaining part of the iron being transferred to a subsequent residue treatment, while the neutralized leach solution is returned to step (a).

2. The method of leaching a zinc concentrate according to claim 1, wherein the amount of said iron sediment returned from step (c) to step (b) is controlled in such a manner that the total amount of the ferric iron present in the zinc ferrite contained in the neutral leach residue from step (a) and the ferric iron contained in the iron sediment returned from step (c) to step (b) is in the range of 30–60 g/liter in terms of the iron concentration in the pulp in step (b).

3. The method of leaching zinc concentrate according to claim 1 or claim 2, wherein the addition of the oxidizing agent in step (c) to the leach solution obtained in step (b) is carried out by blowing in at least one of an oxygen gas and air.

4. The method of leaching a zinc concentrate according to claim 1 or claim 2, wherein the formation of the iron sediment in step (c) is conducted at a pH in the range of 3–4 and at a temperature of not lower than 80° C.

5. The method of leaching a zinc concentrate according to claim 3, wherein the formation of the iron sediment in step (c) is conducted at a pH in the range of 3–4 and at a temperature of not lower than 80° C.

6. The method of leaching a zinc concentrate according to claim 1 or claim 2, wherein at least part of the iron sediment produced in step (c) is returned to step (b) and the remaining part of the iron sediment is transmitted to the subsequent residue treatment, the residue treatment being selected from the group consisting of a hematite process, a jarosite process and a goethite process.

7. The method of leaching a zinc concentrate according to claim 3, wherein at least part of the iron sediment produced in step (c) is returned to step (b) and the remaining part of the iron sediment is transmitted to the subsequent residue treatment, the residue treatment being selected from the group consisting of a hematite process, a jarosite process and a goethite process.

8. The method of leaching a zinc concentrate according to claim 4, wherein at least part of the iron sediment produced in step (c) is returned to step (b) and the remaining part of the iron sediment is transmitted to the subsequent residue treatment, the residue treatment being selected from the group consisting of a hematite process, a jarosite process and a goethite process.

9. The method of leaching a zinc concentrate according to claim 1, wherein the zinc concentrate in step (b) is added in an amount of 1 to 1.2 times the stoichiometric amount with respect to the ferric ions.

10. The method of leaching a zinc concentrate according to claim 9, wherein the leaching is carried out for 2 to 3 hours.

* * * * *